Feb. 13, 1962 JEAN-PIERRE DÉRIAUD 3,021,230

APPARATUS AND METHOD FOR MAGNETICALLY ORIENTING PARTICLES

Filed April 17, 1959 2 Sheets-Sheet 1

JEAN-PIERRE DÉRIAUD
INVENTOR.

BY R. Frank Smith
Robert F. Crocker
ATTORNEYS

APPARATUS AND METHOD FOR MAGNETICALLY ORIENTING PARTICLES

Filed April 17, 1959 2 Sheets-Sheet 2

JEAN-PIERRE DÉRIAUD
INVENTOR.
BY R. Frank Smith
Robert F. Conrad
ATTORNEYS

3,021,230
APPARATUS AND METHOD FOR MAGNETICALLY ORIENTING PARTICLES

Jean-Pierre Dériaud, Paris, France, assignor to Eastman Kodak Company, Rochester, N.Y., a corporation of New Jersey Filed Apr. 17, 1959, Ser. No. 807,237
14 Claims. (Cl. 117—93)

This invention relates to a method and apparatus for use during the manufacture of magnetic tape for orienting the magnetic particles thereon transversely of the length of the tape prior to hardening of the binder. Magnetic tape, normally consisting of a suitable carrier base on one face of which is coated a thin layer of magnetic material, such as iron oxide, dispersed in a suitable binder, has, in recent years, come into very general use for sound recording, etc. Such tapes are normally moved longitudinally past a recording or reproducing head having a gap extending at right angles to the direction of movement of the tape so that the magnetic field across said gap is parallel to said direction of movement. In connection with such use it has been found that, by orienting the magnetic particles so that their magnetic axes extend generally longitudinally of the tape, a considerable improvement in signal-to-noise ratio may be obtained. Similar tapes, but normally of considerably greater width than the tapes used for sound recording, have also been used for recording high frequency signals such as those utilized in television. In order to permit the recording of these extremely high frequencies without requiring an unduly high speed of travel of the tape it is known to record the signals along paths extending laterally across the tape rather than longitudinally thereof as with conventional sound recording. To obtain the improved results due to magnetic orientation of the particles on such tape, it is therefore necessary that means be provided for orienting these particles transversely of the tape so that they are aligned substantially parallel to the direction of travel of the recording head relative to the tape as it sweeps laterally across the tape. Orienting apparatus such as is used for longitudinally orienting the particles during the manufacture of conventional sound tape is obviously not suitable for this purpose.

It is customary to manufacture magnetic tape in relatively wide strips, and to thereafter slit it into a plurality of tapes of the desired final width. The problem of producing a magnetic field extending across the width of this wide strip of tape and of sufficient intensity to suitably orient the particles before the binder has hardened and without otherwise disturbing the distribution of the particles has not, up to the present, been satisfactorily solved.

It is an object of this invention to provide a method and apparatus for thus transversely orienting the magnetic particles of a magnetic tape during the manufacture of such tape.

Broadly these results are attained by moving the freshly coated strip of magnetic tape, prior to hardening of the usual binder, in the direction of its length past and close to a plurality of regions of high magnetic permeability spaced laterally from one another in a direction substantially transverse to the direction of movement of said strip while subjecting said regions to a magnetic field extending from side to side of said tape across said plurality of regions to induce magnetic flux therein. The flux induced in said regions by the magnetic field will tend to spread out at the spaces or gaps between adjacent high permeability regions into the magnetic layer of the tape to magnetically orient those particles located opposite the gaps. The high permeability regions are so arranged that every portion of the coated tape surface will at some time during its passage move into a position directly opposite at least one of the gaps between the high permeability regions.

Apparatus for practicing this method may conveniently comprise means for producing a relatively strong magnetic field which extends laterally across the path of movement of the tape substantially in the plane of such path and flux-guiding means having a plurality of regions of high and low permeability alternately arranged in series across said path and positioned in the magnetic field.

The flux-guiding means may comprise a plurality of elongated bars of soft iron oriented generally lengthwise of the path of movement of the strip and spaced laterally from one another in the direction transversely of said strip. Preferably there are utilized two such sets of flux-guiding means, one located immediately above, and the other immediately below the path of movement of the tape, the two thereby coacting to counteract any tendency of the individual particles to tilt out of the general plane of the tape.

Further objects will become apparent from the following description and claims, particularly when considered in the light of the accompanying drawing wherein:

Figure 4:
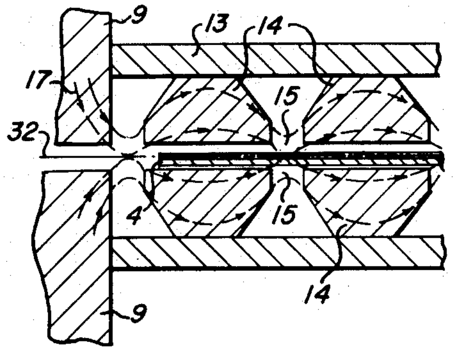
FIG. 4 is an enlarged fragmentary sectional view illustrating the manner in which the flux is guided by the flux guiding assemblies.
Figure 3:
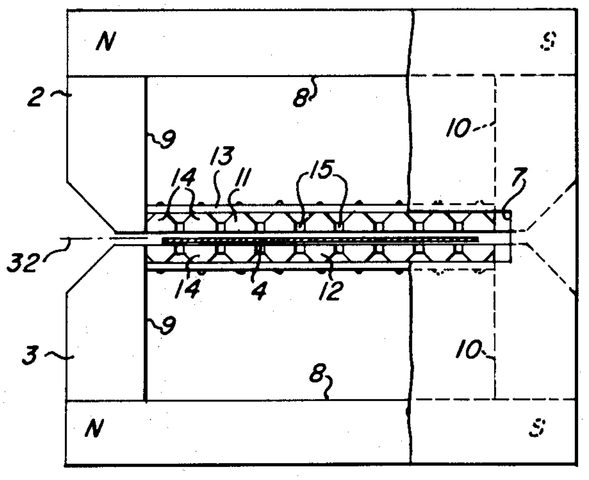
FIG. 3 is an end view of the apparatus.

As best shown in FIG. 3 my improved orienting apparatus comprises a pair of oppositely disposed U-shaped magnet assemblies 2, 3 straddling the path of movement of a strip of freshly coated magnetic tape 4 and respectively disposed above and below the plane of movement of the strip 4. In the following description and in the claims frequent reference will be made to the plane of movement of the tape. As previously mentioned, such tape normally comprises a carrier strip upon which is coated a layer of magnetic oxide in a suitable binder. Throughout this specification the term plane of movement of the strip will be considered to mean the mean plane of the magnetic oxide layer. This plane is indicated by the line 32 in the drawings. These U-shaped magnet assemblies 2 and 3 may conveniently be secured together as by means of end plates 6 of brass or other suitable nonmagnetic material. As shown in FIG. 3 the end plates are provided with suitable slots 7 to permit passage of the tape 4 through the apparatus. Each of the magnetic assemblies comprises a permanently magnetized plate 8 provided at its opposite edges with a pair of pole pieces 9 and 10 of soft iron or other high permeability material, the free end of which pole pieces lie closely adjacent the edges of the tape path. Bridged across these ends of the pole pieces 9 and 10 are a pair of flux guiding assemblies 11 and 12. The upper flux guiding assembly 11 comprises a suitable supporting plate 13 of brass or other nonmagnetic material to the lower face of which are secured a plurality of elongated bars 14 of high permeability material such as soft iron. As is clearly shown in FIGS. 3 and 4 these bars are spaced apart slightly in a direction transversely of the tape path to provide narrow air gaps 15 therebetween which form regions of low permeability. Assembly 12 is similarly constructed but, as is clearly shown in FIGS. 3 and 4, is oppositely arranged so that in this case also the bars 14 are directly adjacent the path of movement of the tape 4. The bars 14 of both sets are parallel to one another and to the plane of movement of the tape and preferably the bars and gaps of assembly 12 are directly opposite those in assembly 11. The effect of this arrangement is diagrammatically illustrated in FIG. 4 where it can be seen that the lines of flux 17 induced by the magnet assemblies will be diverted at the low permeability gaps 15 into the plane of the oxide coating on the tape. It will also be seen that the direction of the magnetic field at these points will be substantially transverse of the tape and substantially parallel to the plane thereof. Thus, those particles carried by the tape opposite these gaps 15 will be magnetically oriented transversely of the tape as is desired.

If the bars 14 were arranged exactly parallel to the direction of movement of the tape through the apparatus only those particles lying along lines directly opposite the gaps 15 would be properly oriented, those opposite the bars 14 being substantially unaffected. To insure that the particles carried by every portion of the tape will pass opposite at least one gap and therefore be magnetically oriented, the bars 14 are therefore arranged slightly out of parallel with the direction of movement of the tape so that they make a relatively small acute angle therewith. By proper selection of the length of the bars 14 and the extent of this angular deviation from the direction of tape movement, the arrangement may readily be made so that the gap between any two adjacent bars at one end of the assembly is offset laterally relative to that at the other end to an extent at least equal to the sum of the width of a bar and the width of a gap. Preferably the length of the bars is so chosen that this condition will be obtained when the bars are at an angle to the direction of movement of the tape not appreciably greater than 10°. Thus, all portions of the tape surface will be subjected to the desired orientation while, at the same time, the direction of the magnetic field will be very nearly at right angles to the direction of movement of the tape. As shown at 16 in FIG. 2 the inner surfaces of the bars 14 at the exit end of the apparatus are preferably curved away from the plane of the tape movement. This results in a gradual decrease of the magnetic field at the exit end of the apparatus and therefore overcomes any tendency of the magnetic particles to pile up at this point.

Figure 5:
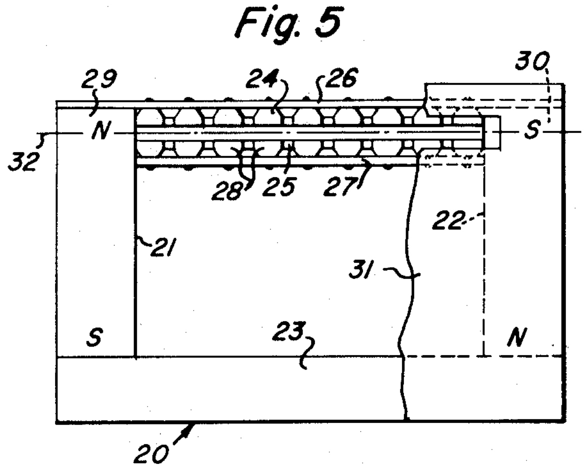
FIG. 5 is an end view of a modified form of my invention.

FIG. 5 shows a modified form of the orienting apparatus wherein a single magnetic assembly 20 is used for inducing the desired magnetic flux in each of the flux-guiding assemblies 24 and 25. In this case the magnet assembly is shown as comprising a pair of vertically arranged bar magnets 21 and 22 bridged at their lower ends by a soft iron plate 23 and at their upper ends by the flux-guiding assemblies 24 and 25. These assemblies comprise the supporting plates 26 and 27 of nonmagnetic material and the spaced bars 28 arranged substantially as are the corresponding members 14 in the FIG. 1 embodiment. Suitable nonmagnetic end plates 31 complete this apparatus.

Figure 1:
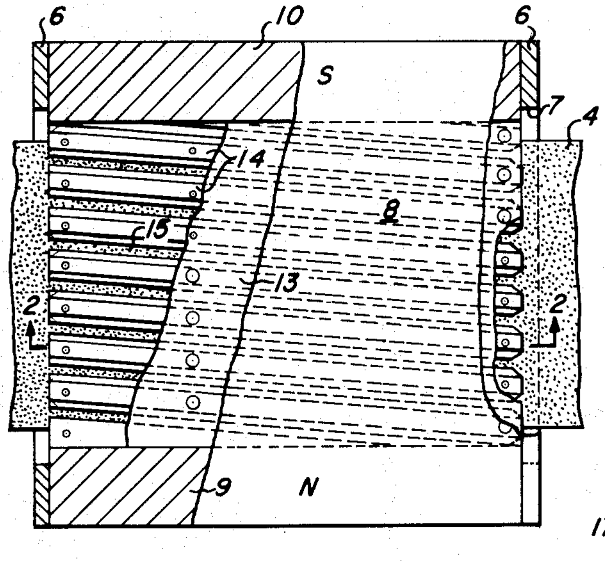
FIG. 1 is a plan view of one form of our improved apparatus with parts broken away to better show the internal construction.
Figure 2:
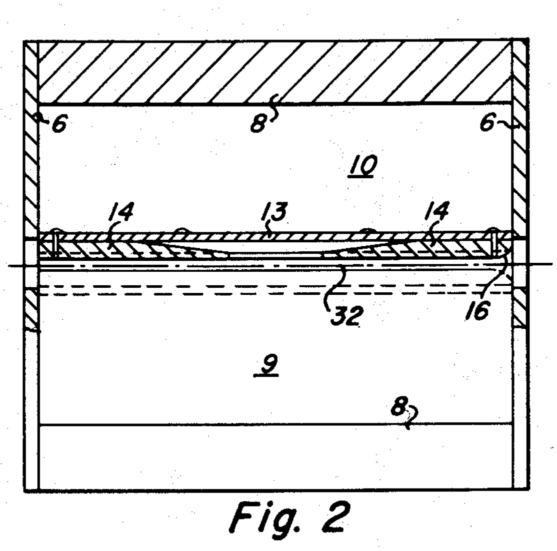
FIG. 2 is a side view of the apparatus with portions thereof shown in section along the line 2—2 of FIG. 1.

It has been found that satisfactory results may be obtained where the width of the individual air gaps is substantially ¼ of the width of the broader surface of the bars 14. Thus, in one such unit, constructed substantially as shown in FIGS. 1–3, the lateral spacing between the pole pieces 9 and 10 was 200 mm. and each flux guiding assembly included eight bars 20 mm. wide on their innermost surfaces and spaced 5 mm. apart. The spacing between the opposing faces of the bars of the upper and lower assemblies was about 8 mm. The length of the apparatus was approximately 300 mm. Thus, this apparatus was capable of orienting a strip of magnetic tape nearly 8″ in width. The above dimensions are in no sense intended to be limiting, however. Obviously, the exact dimensions may be varied considerably and will depend upon such factors as the strength of the magnets, the speed of movement of the strip throughout the apparatus, the degree of hardening of the binder material, the width of the tape, etc. While both embodiments illustrated utilize two sets of flux-guiding members adjacent opposite faces of the strip, some degree of orientation may be attained with but a single flux-guiding assembly. However, there will be a slight tendency in such cases for some of the particles to tilt somewhat out of the general plane of the coating. While permanent magnets have been shown for inducing the flux in the flux-guiding members, it would be obvious to those skilled in the art that other means of inducing a magnetic flux in these members could be utilized, if desired. Many other variations will be obvious and can be adopted without departing from the spirit and scope of the invention as defined by the appended claims.

I claim:

1. Apparatus for orienting magnetic particles loosely secured to one face of a carrier strip as said strip moves along a predetermined path, comprising a plurality of elongated bars of high magnetic permeability extending generally lengthwise of said path of movement of said strip, said bars being supported to lie in a plane parallel to and closely adjacent the plane of movement of said strip and being spaced laterally from one another whereby to conjointly form a magnetic flux path extending laterally across the width of said path of movement and having a plurality of narrow air gaps in series therewith formed by the spaces between adjacent bars, and means forming a pair of magnetic poles of opposite polarity at opposite sides of said path of movement adjacent the outermost of said plurality of bars and arranged to produce a magnetic field having its direction extending generally transversely of said path of movement for inducing magnetic flux in said flux path.

2. Orienting apparatus as set forth in claim 1 wherein said bars are disposed at a relatively small acute angle relative to the direction of movement of said tape, and the bars are of such length that the gap between adjacent bars at one end thereof is offset laterally from the gap therebetween at the other end thereof to an extent at least equal to the sum of the width of a bar and the width of a gap.

3. Orienting apparatus as set forth in claim 1 wherein said magnetic pole forming means comprises a generally U-shaped magnet assembly straddling said path of movement.

4. Apparatus for orienting magnetic particles loosely secured to one face of a carrier strip as said carrier strip moves along a predetermined path, comprising a pair of magnetic flux guiding members lying in closely spaced planes parallel to the plane of movement of said strip along said path and on opposite sides of said plane of movement, each of said flux-guiding members comprising a plurality of elongated parallel bars of high magnetic permeability extending generally lengthwise of said path of movement and spaced laterally from one another to provide a corresponding number of elongated, generally longitudinally extending air gaps therebetween, and means forming magnetic poles of opposite polarity at opposite sides of said path adjacent the outermost of said plurality of bars and arranged to produce a magnetic field having its direction extending generally transversely of said path for inducing magnetic flux in said flux-guiding members.

5. Orienting apparatus as set forth in claim 4 wherein said magnetic pole forming means comprises a generally U-shaped magnet assembly straddling said path of movement.

6. Orienting apparatus as set forth in claim 4 wherein said magnetic pole forming means comprises a pair of oppositely disposed U-shaped magnet assemblies straddling said path of movement for individually inducing magnetic flux in said flux-guiding members.

7. Orienting apparatus as set forth in claim 4 wherein the bars of each of said flux-guiding members are parallel to and directly opposite those of the other flux-guiding member.

8. Orienting apparatus as set forth in claim 4 wherein the bars of each said flux-guiding member are disposed at a relatively small acute angle relative to the direction of movement of said tape, and the bars of such length that one end of the gap between adjacent bars is offset laterally from the other end thereof to an extent at least equal to the width of a bar plus the width of a gap.

9. Orienting apparatus as set forth in claim 8 wherein the bars of each of said flux-guiding members are parallel to and directly opposite those of the other flux-guiding member.

10. Apparatus for orienting magnetic particles loosely secured to one face of a carrier strip as said strip moves along a predetermined path, comprising means located adjacent said path for producing a magnetic field having its field direction extending laterally across said path generally in the plane of movement of said strip, and a flux-guiding assembly located in said field and including means providing a plurality of regions of high and low permeability alternately arranged serially across said path in a plane closely adjacent to and parallel to said plane of movement, said last mentioned means being so arranged that every portion of a strip passing through said apparatus is at one time during such passage directly opposite at least one of said regions of low permeability.

11. Apparatus for orienting magnetic particles loosely secured to one face of an elongated carrier strip as said strip moves lengthwise along a predetermined path, comprising means located adjacent said path for producing a magnetic field having its field direction extending laterally across said path generally in the plane of movement of said strip, and a pair of flux-guiding means located in said field and extending across the width of said path parallel to and on opposite sides of said plane, each said flux-guiding means including means providing a plurality of regions of high and low permeability alternately arranged serially across said path closely adjacent to said plane of movement, said last mentioned means being so arranged that every portion of a strip passing through said apparatus between said flux-guiding means will at some time during such passage be positioned directly opposite at least one of said regions of low permeability.

12. Orienting apparatus as set forth in claim 11 wherein the respective high and low permeability regions of said pair of flux-guiding means are located directly opposite one another in the direction perpendicular to said plane of movement.

13. The method of transversely orienting magnetic particles loosely secured to a carrier strip by a hardenable binder which comprises moving said strip, prior to hardening of said binder, in the direction of its length past and close to a plurality of regions of high magnetic permeability spaced laterally from one another in a direction substantially transverse to the direction of movement of said strip while subjecting said regions to a magnetic field having its field direction extending from side to side of said strip across said plurality of regions to induce magnetic flux therein.

14. The method of transversely orienting magnetic particles loosely secured to a carrier strip by a hardenable binder which comprises moving said strip, prior to hardening of said binder, in the direction of its length closely adjacent a plurality of parallel elongated bars of high magnetic permeability lying in a plane substantially parallel the plane of movement of said strip with their longitudinal axes extending generally parallel to the direction of movement of said strip and spaced slightly laterally from one another in the direction transversely of said strip while subjecting said bars to a magnetic field having its field direction extending substantially transversely across said strip to induce magnetic flux in said bars.

References Cited in the file of this patent

UNITED STATES PATENTS

| | | |
|---|---|---|
| 2,711,901 | Von Behren | June 28, 1955 |
| 2,796,359 | Speed | June 18, 1957 |
| 2,936,408 | Bennetot | May 10, 1960 |